June 25, 1929.  O. C. HANSON  1,718,818
BLOCKING AND CULTIVATING MACHINE FOR PLANTS
Filed Nov. 23, 1927
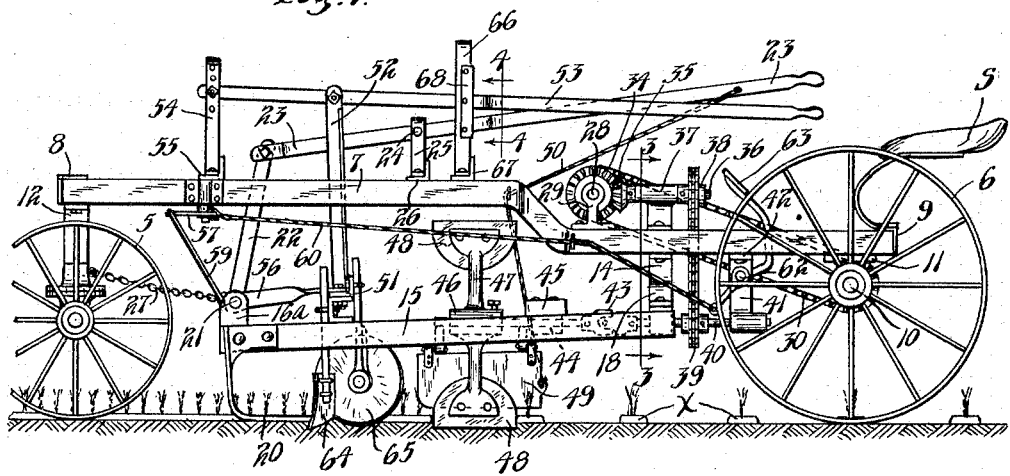
INVENTOR.
OLE C. HANSON.
BY HIS ATTORNEYS
Williamson Reif & Williamson Patented June 25, 1929.

1,718,818

UNITED STATES PATENT OFFICE.

OLE C. HANSON, OF HOPKINS, MINNESOTA.

BLOCKING AND CULTIVATING MACHINE FOR PLANTS.

Application filed November 23, 1927. Serial No. 235,326.

This invention relates to a machine for blocking and cultivating plants and while adapted for wide general usage has special application for sugar beets and the like.

It is the main object of my invention to provide a comparatively simple but highly efficient machine which will remove plants at regular intervals on the row, blocking the row and leaving uniformly spaced clumps of plants therein and which will simultaneously cultivate and hill the rows by the co-operative action of the cultivating and blocking elements.

A further object is to provide a machine of the class above described wherein the plants are blocked by the movement of elements transversely of or at an angle to the line of the row.

Another object is to provide an improved blocking and cultivating machine wherein the several working elements may be easily controlled and various adjustments effected from the rider's seat.

These and other objects and advantages of the invention will be apparent from the following description made in connection with the accompanying drawings wherein like reference characters refer to similar parts throughout the several views and in which, Fig. 1 is a side elevation of a preferred embodiment of the invention;

Fig. 2 is a plan view of the same;

Fig. 3 is a vertical cross section taken on the line 3—3 of Fig. 1, showing the connection between the main frame and the movable frame or rigs; and Fig. 4 is a vertical cross section taken on the line 4—4 of Fig. 1, illustrating the manner in which the control levers are guided and held at desired positions.

In the embodiment of the invention illustrated in the drawings, a relatively heavy main frame is provided supported on front wheels 5 and rear wheels 6. Said main frame may be constructed from a pair of channel members 7 connected at their respective ends by means of transverse angle bars 8 and 9. As shown, the channel sides 7 of said frame have their rear portions offset from their forward portions both vertically and inwardly, the rear ends of said channel members being secured to the rear stationary axle 10 by suitable clamping members 11. The forward end of the main frame is supported from a heavy bolster 12 pivotally secured in upright position to the front axle. A tie bar 13 is secured across the main frame forwardly of the rear wheels and substantially alined with said tie bar below the frame is secured a transverse U-shaped supporting bar 14.

A movable frame or rig is suspended below the main frame shown as comprising a pair of spaced channel members 15 connected at their forward ends by cross bar 16 and at their rearward ends by cross bar 17. An inverted U-shaped member 18 also traverses the rearward ends of channel members 15 being pivotally connected to and supported from the U-bar 14 of the main frame by means of a heavy upstanding bolt 19. Bolt 19 is rigidly supported from cross bar 17 and passes through U-shaped bars 14 and 18 and connects the rear-end of the movable frame with sufficient play to permit the forward end thereof to be moved on a horizontal axis to some extent. The forward end of the movable frame is provided with a pair of spaced shoes 20 adapted to be dragged over the soil when the blocking elements are put in motion. Cross bar 16 connecting the forward ends of the movable frame is provided with upturned ears 16ª in which a horizontal shaft 21 is mounted, said shaft extending transversely beneath the main frame and a short distance above the forward end of the movable frame. A link 22 is connected at its lower end to the shaft 21 and is pivotally connected at its upper end to the working end of an elongated lever 23 of the first order working on a horizontal pivot 24, the handle end of lever 23 being disposed just forwardly of the driver's seat S in position to be conveniently manipulated therefrom. The pivot or fulcrum 24 for said lever may be supported from an upstanding member 25 supported from the main frame by a transverse angle bar 26. Draft chains 27 connect shaft 21 at the forward end of the movable frame with the cross bar 8 at the forward end of the main frame.

A transverse shaft 28 is journaled in suitable bearings 29 mounted on the offset portion of the main frame and is connected by an endless chain 30 to a clutch element 31 loosely mounted on the rear axle shaft 10. Clutch element 31 is adapted to mesh with a co-operating clutch element 32 rigidly carried by the right rear wheel 6 and a shipper lever 33 is provided operative to connect or disconnect said clutch elements for driving. A beveled gear 34 is fixed to the driven shaft 28 in constant mesh with a beveled gear 35 fixed to the forward extremity of a stub shaft 36, said stub shaft extending longitudinally of the main frame and being journaled in a suitable sleeve bearing 37 supported from the cross bar 13. A sprocket wheel 38 is fixed to the rearward end of stub shaft 36 connected by a sprocket chain 39 to drive a propeller shaft 40. Propeller shaft 40 is substantially vertically alined with stub shaft 36 and is mounted below said stub shaft with its rear end journaled in a suitable depending bearing 41 supported from a cross bar 42 beneath the rear end of the main frame. The forward portion of the propeller shaft 40 is connected by a universal joint 43 to the rearward portion of shaft 40 and is journaled in an elongated sleeve bearing 44 secured to the under side of a heavy cross bar 45 traversing the channel bars 15 of the movable frame.

A hub 46 is fixed to the forward end 40ª of the propeller shaft rigidly carrying a plurality, shown as two, of radial arms 47, said arms having rigidly secured at their outer ends the blocking hoes 48. As shown said hoes have rectilinear outer working edges and arcuate inner edges. It will be obvious that the hub 46 carrying said blocking hoes will be rotated by rear wheel 6 causing the blocking hoes to move substantially transversely of the longitudinal center line of the frame. As illustrated in the drawings, hub 46 is driven in a counterclockwise direction when viewed from the driver's seat S. I provide a relatively heavy curtain guard 49 hinged on substantially a horizontal axis to the right side of the movable frame and disposed outwardly of the orbit of blocking hoes 49, the purpose of said guard being to prevent the dirt from being thrown outwardly from the hills by the movement of hoes 48. Curtain guard 49 may be provided with a manipulating cable or cord 50 attached to an intermediate portion of the curtain guard and passing through a suitable guide on the right hand side of the main frame. The upper end of cable 50 may be attached to lever 23 adjacent the driver's seat S for convenient manipulation.

A suitable cultivator rig 51 is adjustably supported from the main frame and may be regulated independently of the movable frame previously described. As shown, cultivator rig 51 is rigidly connected to the lower end of a post 52, the upper end of said post being pivotally connected to the intermediate portion of a lever 53 of the second order, said lever being fulcrumed at its forward end to an upstanding post 54 rigidly supported from a suitable cross bar 55 traversing the main frame. As shown, the fulcrum of lever 53 may be vertically adjusted to suit requirements. A pair of spaced draft bars 56 pivotally connect the cultivator rig 51 with shaft 21 at the forward end of the movable frame. Suitable rig shifting mechanism is employed in connection with the forward ends of draft bars 56 and may be of any suitable type. As shown, a pair of bell crank levers 57 are mounted on the main frame, one at each side thereof, adapted to swing on vertical axes. A spacing sleeve 58 is interposed between the forward ends of draft bars 56 and said bell crank levers 57 are connected by flexible members 59 to suitable collars connected with spacing sleeve 58. Bell crank levers 57 are also connected by cables 60 to a pair of arms 61 fixed to the outer ends of a pair of independent rock shafts 62. Rock shafts 62 are each provided with pedals 63 adapted to be manipulated by the driver to shift the cultivator rig horizontally and transversely of the machine.

A pair of oppositely and outwardly inclined cultivator shovels 64 are rigidly mounted from the rig 51 adapted to throw the soil inwardly against the plants while a pair of forwardly inclined cultivating discs 65 are disposed rearwardly of shovels 64 with their forward ends in close relation and spaced apart a sufficient distance to clear the plants.

Means for retaining levers 23 and 53 in desired positions is provided in the form of a heavy U-shaped inverted strap 66 supported in substantially vertical position from a cross bar 67 traversing the main frame forwardly of the dropped or offset portion thereof. Levers 23 and 53 pass through said strap and a notched retaining plate 68 is provided for retaining the cultivator drop lever 53 in a plurality of different positions. A tooth 69 is provided adjacent the base of strap 66 to retain the movable frame lever when the movable frame has been elevated.

Operation.

The device, of course, is adapted to be pulled across the field and over the tops of standing plants. The driver occupying the seat S may conveniently reach all the control levers and pedals from that position. Shipper lever 33 is first thrown inwardly to engage clutch elements 31 and 32, causing shaft 28 and the propeller shaft 40 to be driven from the rear wheels. Movable frame control lever 23 may be released, whereupon the forward end of said movable frame will be supported from the ground by the shoes 20 in proper position to cause blocking hoes 48 to intermittently remove small amounts of soil and plants from the row. The entire movable frame and cultivator rig 51 may be shifted easily by manipulation of the pedals 63 to correctly follow the row of plants. The small amounts of soil which will be thrown laterally of the machine, due to the action of blocking hoes 48 will strike curtain guard 49 and be distributed adjacent the row. Cultivator shovels 64 plow the soil throwing the same inwardly against the row, while cultivating discs 65 efficiently cultivate the row, and aid in ridging the same. The intermittent action of blocking hoes 48 remove portions of the ridged row as shown in Fig. 1, leaving with each group of standing plants a hill X. It will be seen that this hilling is due to the successive action of cultivator shovels 64, cultivator discs 65 and blocking hoes 48. Obviously, the depth of shovels 64 and cultivator discs 65 may be adjusted as desired by the drop lever 23. If the driver notices a large stone or other impediment in position to be struck by the guard curtain 49 he can quickly pull the guard cable 50, swinging guard 49 upwardly and out of the way of said obstruction, although the free swinging of said guard is usually sufficient to prevent injury to the same.

Assuming that the row is followed with fair accuracy the plants will be removed at regular intervals leaving standing relatively small clumps of plants, said clumps being equally spaced apart. This is necessarily so since the speed of revoluble hub 47 is determined by the turning of rear wheels 6. Assuming the traction of said wheels to be substantially constant, clumps of standing plants will be spaced apart at predetermined distances throughout the rows.

It will be obvious that my machine will cultivate and block the rows of plants as fast as it is drawn along the rows. Its capacity for work, therefore, is very great, and this work which formerly required the use of a cultivator and the extremely slow manual blocking of the plants, can now be efficiently accomplished in a very short time.

The machine makes provision for all requisite adjustments of the cultivating and blocking elements and is so constructed that a single operator may do the work in a very short time which formerly required days of manual labor and the employment of many hands.

It will, of course, be understood that various changes may be made in the form, details, arrangement and proportions of parts without departing from the scope of the invention.

What is claimed is:

1. In a device of the class described, a main frame supported on front and rear wheels, an auxiliary frame supported at its rear end from said main frame with freedom for vertical swinging movement, a flexible shaft disposed longitudinally of said auxiliary frame, driving connections between said flexible shaft and the rear wheels of said frame, a hoeing element fixed to said shaft and extending radially therefrom, and having a working edge disposed longitudinally of said main frame, means for elevating the forward end of said auxiliary frame and a ground engaging shoe mounted below said swingable auxiliary frame.

2. In a device of the class described, a main frame, supported on wheels, an auxiliary frame, supported at its rear end from said main frame and extending therebelow, means for supporting said auxiliary frame, a shaft having a universal joint therein and extending below said main frame longitudinally thereof, the forward portion of said shaft being journaled in said auxiliary frame and the rear portion of said shaft being journaled in said main frame, driving connections between the rear portion of said shaft and said wheels, a radial arm fixed to the forward portion of said shaft, a hoeing element fixed to the outer end of said arm and having a working edge extending substantially parallel with the axis of said shaft, means for elevating the forward end of said auxiliary frame and means for swinging said auxiliary frame relative to said main frame on a substantially vertical axis.

3. In a device of the class described, a main frame supported on front and rear wheels, an auxiliary frame beneath said main frame supported from said main frame at its rearward end and capable of vertical and horizontal swinging movement relative to said main frame, a ground engaging shoe adapted to support said auxiliary frame, a flexible shaft having its forward portion journaled in said auxiliary frame and its rear portion journaled in said main frame, driving connections between the rear portion of said shaft and the rear wheels of said main frame, a radial arm fixed to the forward portion of said shaft and a hoeing element mounted on the outer end of said arm having a working edge disposed substantially parallel to the axis of said shaft, means for elevating the forward end of said main frame and foot controlled means for swinging said auxiliary frame on a substantially vertical axis.

4. In a device of the class described, a main frame supported on front and rear wheels, an auxiliary frame supported below said main frame and having its rear end connected to said main frame for swingable movement, a flexible shaft having its forward end journaled in said auxiliary frame and its rearward end journaled in said main frame, driving connections between the rearward end of said shaft and the rear wheels of said main frame, a radial arm fixed to the forward end of said flexible shaft, a blocking hoe fixed to the outer end of said arm and having a working edge disposed longitudinally of said main frame, a cultivator rig mounted forwardly of said blocking hoes and having draft means pivotally connected to the forward end of said auxiliary frame, a pair of oppositely inclined spaced cultivating shovels supported from said rig adapted to throw soil against the sides of a row of plants, and means for regulating the height of said rig.

5. In a device of the class described, a main wheel supported frame, an auxiliary frame supported at its rear end from said main frame with freedom for vertical swinging movement, a flexible shaft disposed longitudinally of said auxiliary frame, driving connections between said flexible shaft and wheels of said frame, a revoluble hoeing element fixed to said shaft and having a working edge disposed longitudinally of said main frame, means for elevating said auxiliary frame and ground engaging means mounted below the forward end of said swingable auxiliary frame and adapted to support said auxiliary frame for operation of the hoeing element.

In testimony whereof I affix my signature.

OLE C. HANSON.